United States Patent Office 3,533,987
Patented Oct. 13, 1970

3,533,987
METHOD FOR CURING VICINAL EPOXIDES USING CURING AGENTS ABSORBED ON ZEOLITES
Santo Giambra, Kenmore, and Donald J. Waythomas, Lancaster, N.Y., assignors to Union Carbide Corporation, a corporation of New York
No Drawing. Original application June 11, 1962, Ser. No. 201,334, now Patent No. 3,417,046. Divided and this application May 9, 1968, Ser. No. 736,899
Int. Cl. C08g 51/04
U.S. Cl. 260—37                        7 Claims

ABSTRACT OF THE DISCLOSURE

A method for curing organic resins in which a mixture is provided in a reaction zone below curing temperature. This mixture comprises: (1) the selected curable member, (2) the curing agent-containing molecular sieve, and (3) as a release agent, a glycol compound. The mixture is stored until curing is desired. The reaction zone is then heated to a curing temperature at which the curing agent is displaced from the molecular sieve and reacted with the curable member.

RELATED APPLICATIONS

This is a divisional application of copending application Ser. No. 201,334, filed June 11, 1962, now U.S. Pat. 3,417,046.

This invention relates to the improved release of active chemical curing agents previously adsorbed in crystalline zeolitic molecular sieves. The curing agents are released in a reaction zone at elevated temperatures where they serve as accelerators or catalysts for the curing of organic resins such as the epoxy, polyester, polysiloxane, polysiloxane-epoxy, phenolic, polyethylene glycol-dimethacrylate, and the chemicaly cross-linked polyethylene type. Resins are useful in the manufacture of potted electrical components, adhesives, coatings, sealants or impregnated tapes. The invention is also applicable to the curing of curable elastomers such as rubber formulations. The many end uses of rubber are well known.

Various methods have been proposed for controlled release of curing agents from molecular sieves. For example, water may be employed to displace the active agent in a reaction zone. However, epoxy resins find important uses in electrical service, and the presence of residual water in such resins may have deleterious effects on the electrical properties of the cured, finished product. Furthermore, water is so strongly adsorbed by molecular sieves that the active agent is rapidly released. This may not be desirable or convenient in all epoxy and rubber systems.

Another previously proposed method of releasing curing agents from molecular sieves is by coadsorption of a polar material. The latter facilitates a lower release or desorption temperature for the active agent than would be required absent the polar material. However, the disadvantages of this method include the necessity of first coadsorbing the active agent and the polar material in the molecular sieve. That is, a limited amount of curing agent can be accommodated by the molecular sieve due to the need for coadsorption of the release material. As a result both the curing agent and the release material are not present in as large amounts as may actually be needed under some processing conditions. Practical considerations often limit the amount of release agent which can be coadsorbed along with the curing agent. Accordingly, the sieve containing both the curing agent and the release material must often be heated to above about 160° C. for release of the active agent, whereas many systems favor or require lower curing temperatures, as for example, where epoxy resins are used to encapsulate delicate, temperature-sensitive electronic components or where the resins are cast in large masses.

It should be recognized that one important advantage of all chemical-loaded molecular sieves in resin formulations is that extended pot lives may be achieved in one package. The conventional epoxy systems cannot be premixed if extended storage stability is desired; hence, very often "two-package" systems are required to provide the extended pot life necessary for packaging. That is, if the accelerator or catalyst were mixed directly with the curable formulation, the reaction would proceed almost immediately and it would be useless to attempt to package the mixture for processing at a later date.

While resin formulations are desirably stored at ambient temperature and then heated when curing is desired, rubber formulations are usually prepared at a first elevated temperature and then subjected to various stages of processing such as extruding and molding. Molecular sieves provide a means for holding the curing agent intact and inactive during these preliminary processing stages, so that a long scorch time is achieved. On heating to a second further elevated temperature the curing agent is released from the molecular sieve for participation in a reaction, so that a short cure time is realized.

An object of this invention is to provide an improved method for obtaining effective release of adsorbed curing agents from molecular sieves.

Another object is to provide an improved method for releasing adsorbed curing agents for organic resin and rubber formulations, which method does not involve the use of water.

Still another object is to provide a water-free method for curing resin and rubber formulations at lower temperatures than heretofore possible.

Other objects are to provide improved resin and rubber formulations which can be heat cured at lower temperatures than heretofore possible.

Further objects and advantages of the invention will be apparent from a reading of the ensuing disclosure and claims.

It has been discovered that the aforementioned problems may be overcome and the objects realized by providing a method for curing a member selected from the group consisting of resins and curable elastomers in which a curing agent, is adsorbed within the inner adsorption region of a dehydrated crystalline zeolitic molecular sieve. The selected curable member, the curing agent-loaded molecular sieve, and a release agent are provided in a reaction zone at below curing temperature. The release agent is a dehydrated organic hydroxyl-containing compound, having a critical dimension no larger than the apparent pore size of the molecular sieve, as for example, alcohols, diols, triols, polyols, phenols, organic acids, glycol ethers, ketones (as the enol form), and alkanolamines of the class $R_3N$ where at least one R has an OH group and the remainder are alkyl, such as triethanolamine and N,N-dimethyl ethanolamine. The release agent is not appreciably adsorbed by the molecular sieve at below curing temperature. When curing is desired, the reaction zone is heated to a preselected suitable curing temperature of at least about 75° C. At the selected temperature, the release agent begins to occupy the adsorption sites of the molecular sieve and thus displaces the curing agent from the molecular sieve. That is, the selectivity of the molecular sieve for the release agent apparently increases when the reaction zone is heated to the curing temperature. The released curing agent then reacts wtih the selected curable member.

The release agent must be of sufficiently small molecular size to pass into the inner adsorption region of the molecular sieve, and displace the curing agent at the desired curing temperature. Since the apparent pore size of the largest known crystalline zeolitic molecular sieve is about 10 angstrom units, this value approximately represents the critical dimension of the largest release agent useable in the present invention.

Examples of alcohols suitable as the release agent include methanol, ethanol, propanol and butanol. Satisfactory organic acids include acetic acid, oxalic acid and maleic acid. Diols are particularly suitable, as for example ethylene glycol, 1,3-propylene glycol, 1,4-butanediol, and 1,5-pentanediol, and hexylene glycol. Satisfactory triols include glycerol and 1,2,6 hexanetriol. Glycol ethers found useful include Cellosolves and Carbitols, as manufactured and sold by Union Carbide Corporation, 270 Park Ave., New York City. Polyglycols found useful include polypropylene glycols and polyethylene glycols.

In the case of alcohols, glycol ethers, diols, triols, organic acids, ketones and polypropylene glycols, compounds of molecular weights below about 450 are suitable as the release agent. However, when polyethylene glycols are used, the molecular weight may be as high as about 4000, particularly if the higher curing temperatures are employed. Particularly preferred release agents for epoxy resin formulations are hexylene glycol (mol. wt. 118), glycerol (mol. wt. 92), a polypropylene glycol of about 150 average mol. wt., and a polyethylene glycol of about 400 average mol. wt.

Materials of large critical dimension such as refined castor oil (largely glyceryl triricinoleate) have not given consistently satisfactory results in that no cure was obtained under the test conditions and was not deemed to be acceptable for commercial use. It was found that castor oil is not adsorbed by sodium zeolite X, or at most only very slowly, whereas a polyethylene glycol of about 600 average molecular weight is readily adsorbed on this molecular sieve with definite evolution of heat. In the case of castor oil, it is believed that negligible adsorption because its large critical dimension was the primary factor contributing to unsatisfactory release of the curing agent.

The organic hydroxyl-containing release agents must be dried to less than about 0.5 wt. percent $H_2O$ before incorporation in the epoxy resin or rubber formulations to avoid premature release effects or foaming. This predrying step may be accomplished by any known desiccating means. One particularly effective method involves the use of molecular sieve adsorbents such as potassium zeolite A (Linde Type 3A), sodium zeolite A (Linde Type 4A), and calcium zeolite A (Linde Type 5A) Molecular Sieves. These materials are characterized by high adsorption capacity for water from liquids containing any traces of water, and can effectively dry polar liquids such as alcohols and glycols.

It appears that the amount of hydroxyl release agent present will affect the pot life and curing characteristics. Adjustment of the hydroxyl release agent concentration, therefore, should provide a convenient means for controlling the properties of resin formulations. Excellent results have been obtained with a release agent-curing agent weight ratio of 1. For example, with zeolite X containing 20 wt. percent diethylene triamine as the curing agent, it is preferred to use 1 part by weight release agent per 5 parts by weight of the curing agent-molecular sieve. If less release agent is used, the pot life will be improved at the expense of cure time, while the reverse is true if more release agent is employed.

The term "zeolite," in general, refers to a group of naturally occurring and synthetic hydrated metal aluminosilicates, many of which are crystalline in structure. There are, however, significant differences between the various synthetic and physical properties such as X-ray powder diffraction patterns.

The structure of crystalline zeolitic molecular sieves may be described as an open three-dimensional framework of $SiO_4$ and $AlO_4$ tetrahedra. The tetrahedra are crosslinked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off at least a portion of the water of hydration. The space remaining in the crystals after activation is available for adsorption of adsorbate molecules having a size, shape and energy which permits entry of the adsorbate molecules into the pores of the molecular sieves. Activation may be conveniently carried out by heating the zeolite under reduced pressure until the water is removed. The temperature required depends upon the properties of the particular zeolite. In general, when crystalline zeolitic molecular sieves are to be used for adsorption of active chemicals such as curing agents and catalysts for use in the present invention, such sieves should preferably be fully activated or nearly so, that is, they should contain less than about 2 weight percent water in order to obtain the maximum advantage from the use of the active chemical-loaded molecular sieve.

The zeolites occur as agglomerates of fine crystals or are synthesized as fine powders and are preferably tableted or pelletized for large-scale adsorption uses. Pelletizing methods are known which are very satisfactory because the sorptive character of the zeolite, both with regard to selectivity and capacity, remains essentially unchanged.

Any type of crystalline zeolitic molecular sieve may be employed in the present method according to this invention. The selection of the particular sieve to be used will depend on factors such as the maximum critical dimensions of the curing agent molecule and release agent molecule to be employed, the apparent pore size of the molecular sieve, and the nature of the reaction within the reaction zone. For example, the pores must be at least large enough to receive the desired molecules. The term, "apparent pore size," as used herein, may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

Among the naturally occurring crystalline zeolitic molecular sieves are chabazite, erionite, faujasite, analcite, clinoptilolite and mordenite. The natural materials are adequately described in the chemical art. Synthetic zeolitic molecular sieves include zeolites A, D, R, T, X, Y, L and S. Zeolites such as types X, Y, L and faujasite are particularly useful because of their relatively large pore sizes.

Zeolite A is a crystalline zeolitic molecular sieve which may be represented by the formula:

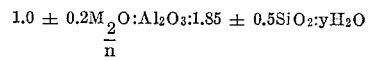

wherein M represents a metal, $n$ is the valence of M, and $y$ may have any value up to about 6. The as-synthesized zeolite A contains primarily sodium ions and is designated sodium zeolite A. Zeolite A is described in more detail in U.S. Pat. No. 2,882,243 issued Apr. 14, 1959.

Zeolite T is a synthetic crystalline zeolitic molecular sieve whose composition may be expressed in terms of oxide mole ratios as follows:

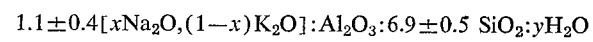

wherein $x$ is any value from about 0.1 to about 0.8 and $y$ is any value from about zero to about 8. Further characterization of zeolite T by means of X-ray diffraction techniques is described in U.S. Pat. No. 2,950,952, issued Aug. 30, 1960.

Zeolite X is a synthetic crystalline zeolitic molecular sieve which may be represented by the formula:

$$0.9 \pm 0.2 \frac{M_2O}{n} : Al_2O : 2.5 \pm 0.5 SiO_2 : yH_2O$$

wherein M represents a metal, particularly alkali and alkaline earth metals, $n$ is the valence of M, and $y$ may have any value up to about 8 depending on the identity of M and the degree of hydration of the crystalline zeolite. Sodium zeolite X has an apparent pore size of about 10 angstrom units. Zeolite X, its X-ray diffraction pattern, its properties, and methods for its preparation are described in detail in U.S. Pat. No. 2,882,244 issued Apr. 14, 1959.

Zeolite Y is described and claimed in U.S. patent application Ser. No. 109,487 filed May 12, 1961 in the name of D. W. Breck.

Zeolite L is described and claimed in U.S. patent application Ser. No. 122,398 filed July 7, 1961 in the name of D. W. Breck and N. A. Acara.

Zeolite R is described and claimed in U.S. Pat. No. 3,030,181, issued Apr 17, 1962.

Zeolite S is described and claimed in U.S. Pat. application Ser. No. 724,843 filed Mar. 31, 1958 in the name of D. W. Breck.

Zeolite D is described and claimed in U.S. Pat. application Ser. No. 680,383 filed Aug. 26, 1957 in the name of D. W. Breck and N. A. Acara.

The molecular sieve may be internally loaded with a curing agent or catalyst by placing in a vacuum desiccator a weighed portion of activated crystalline zeolite molecular sieve in a container which exposes a substantial surface. The compound to be adsorbed is then placed within the desiccator in another communicating container. A vacuum is placed on the desiccator and the system is then sealed. The rate of adsorption is a direct function of the vapor pressure of the compound being loaded. If the rate of adsorption is too slow at room temperature, the desiccator may be subjected to elevated temperatures. The weight percent loading is calculated from the weight increase of the molecular sieve. If the curing agent is a solid, it may be adsorbed by intimate mixing or blending with the molecular sieve. Again, heating either during or after blending accelerates the adsorption. If the material does not possess appreciable vapor pressure, it may be adsorbed by the molecular sieve from a liquid solution wherein the solvent is not adsorbed. Also, loading may be achieved by controlled contact of a liquid curing agent and the activated molecular sieve.

The amount of curing agent or catalyst loaded on the molecular sieve is generally in the range of about 0.001 to 25% by weight based on the weight of the sieve. At different weight percent loadings there is no substantial difference in performance of the loaded sieve for its intended purpose.

The present invention may be employed for the curing of natural and synthetic resins as for example the epoxy type containing at least one of the following reactive groups in their molecule:

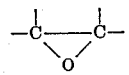

The epoxy resins may be saturated or unsaturated, aliphatic, cycloaliphatic, aromatic or heterocyclic and may be substituted with non-interfering substituents. The epoxy may be either present as a terminal or interior group.

Illustrative of the monomeric type epoxy resins are the following: vinyl cyclohexane dioxide, epoxidized soybean oil, butadiene dioxide, 1,4-bis(epoxypropoxy)benzene, 1,3 - bis(2,3-epoxypropoxy)cyclohexane, 4,4 - bis(2-hydroxy-3,4-epoxybutoxy) - diphenyldimethylmethane, 1,3-bis(4,5-epoxypentoxy) - 5 - chlorobenzene, 1,4-bis(3,4-epoxybutoxy)-2-chlorocyclohexane, 1,3 - bis(2-hydroxy-3,4-epoxybutoxy)benzene, 1,4 - bis(2-hydroxy-4,5-epoxypentoxy)benzene, 1,2,5,6-diepoxy - 3 - hexane, 1,2,5,6-diepoxyhexane and 1,2,3,4-tetra(2-hydroxy - 3,4 - epoxybutoxy)-butane. Other compounds of this type include the glycidyl polyethers of polyhydric phenols obtained by reacting mixtures containing a molar amount of a polyhydric phenol with a stoichiometric excess, i.e., 3 to 6 moles per each phenolic hydroxy group, of an epihalohydrin in an alkaline medium, and also polyglycidyl esters, such as are prepared by reacting an epihalohydrin with a salt of a polybasic acid.

Examples of the polymeric type epoxy resins include the glycidyl polyethers of polyhydric phenols obtained by reacting, preferably in an alkaline medium, a polyhydric phenol and 1–2 moles of an epihalohydrin per each phenolic hydroxyl group. Illustrative of this particular type compound is the polyether obtained in reacting 1 mole of bis(4-hydroxyphenyl)-dimethylmethane with 1.5 moles of epichlorohydrin in the presence of an alkaline catalyst.

Among the curing agents suitable for curing epoxy resin formulations and which have been loaded into activated molecular sieves are polyamines such as diethylenetriamine, triethylenetetramine, m-phenylenediamine, and ethylenediamine. Other suitable amine curing agents are triethanolamine, N,N-dimethylethanolamine, benzyldimethylamine, and triethylamine.

The present invention may also be employed for curing other resin formulations such as the unsaturated polyester resins. These are formed by combining the reaction product of a dihydric alcohol, such as alkylene glycols and an unsaturated dibasic acid, such as maleic acid, with a polymerizable monomer such as styrene in the presence of a peroxide curing agent. Suitable peroxides which can be adsorbed on molecular sieves include tertiary butyl hydroperoxide, ditertiary butyl peroxide and dicumyl peroxide. Cross-linking takes place between the double bonds in the polyester and the styrene monomer to form an insoluble, infusible resin.

Another resin curable by the invention in dimethacrylate esters of a glycol such as polyethylene glycol, which are compatible with polyvinyl chloride. The resultant plastisol when cured with a peroxide catalyst is extremely hard and strong.

Polysiloxane resins may be cured by amines such as diethanolamine. Polysiloxane-epoxy resins can be cured by the same agents as previously listed for epoxy resins. Phenolic resins are cured by, for example, ammonia and formaldehyde, or hexamethylene tetramine. The chemically cross-linked polyethylene resins are curable by peroxide compounds such as dicumyl peroxide, dietertiary peroxide.

The present invention may be employed for the curing of various types of rubber formulations. The adsorbed curing agent may be sulfur, a peroxide such as dicumyl peroxide, a polyamine such as triethylenetetramine and other suitable cross-linking agents. An adsorbed accelerator may be the "primary" type which actually catalyzes the formation of sulfur radicals or the "secondary" type (commonly called the "activator") which increases the activity of the primary accelerator. Alternatively, that adsorbed curing agent may be a combination of primary and secondary type accelerators.

The rubber formulation may, for example, be the neoprene type, which is the generic term applied to the group of synthetic elastomers based on the polymers of chloroprene, that is, 2-chlorobutadiene-1,3. Two particularly important classes of polychloroprene polymers are designated Type G neoprenes and Type W neoprenes. Type G neoprenes are sulfur-modified chloroprene-based synthetic elastomers and Type W neoprenes are stabilized non-sulfur modified chloroprene-based synthetic elastomers. Suitable neoprene accelerators include, dihydroxy benzenes, such as pyrocatechol and resorcinol; alkyl-substituted dihydroxy benzenes such as ethyl catechol and ethyl resorcinol; and hydroxy-substituted benzoic acids, such as salicyclic acid and p-hydroxy benzoic acid. Other neoprene accelerators are well known to the art, and a more complete listing can be found in U.S. Pat. No. 3,036,983 issued May 29, 1962 in the name of F. M. O'Connor. The disclosure of this patent is incorporated herein to the extent pertinent.

The rubber formulation may also be the butyl type made by copolymerizing an isoolefin, usually isobutylene, with a minor proportion of a multi-olefinic unsaturate having from 4 to 14 carbon atoms per molecule. The isoolefins used generally have from 4 to 7 carbon atoms, and such isomonoolefins as isobutylenes or ethylmethylethylene are preferred. The multi-olefinic unsaturate usually is an aliphatic conjugated diolefin having from 4 to 6 carbon atoms, and is preferably isoprene or butadiene. Suitable accelerators for butyl rubber curing include strong acids such as HCl, HBr, HI and other halogen-substituted organic acids. Other suitable accelerators are unsaturated organic halides as 1,4-dichlorobutene, 2-chloropropene, 2-bromopropene and 2-iodopropene; also acyl halides such as benzoyl chloride; and alkyl benzenes such as alphaalphaalpha trichlorotoluene. The incorporation of curing accelerators in molecular sieves for butyl rubber curing is described more completely in U.S. Pat. No. 3,036,986, issued May 29, 1962 in the names of F. M. O'Connor et al. The disclosure of this patent is incorporated herein to the extent pertinent.

The present invention may also be employed for the curing of other rubber formulations, as for example the Buna or SBR type. Buna rubber comprises about 75% butadiene, styrene being the other main constituent. Suitable well-known accelerators for Buna rubber include thiurams, arylamines, alkylarylamines and thioureas. Specific examples are piperidine, diethylamine, and di-n-butylamine.

Natural rubbers are also amenable to this novel method as are other synthetics such as polyacrylates, polyisoprene, polybutadiene, ethylenepropylene rubber, butadiene acrylonitrile copolymers, butadiene acrylic ester copolymers, and silicone rubber.

It should be understood that this invention may not be employed where the release agent is reactive with a functional group in the curable member at below the curing temperature.

In carrying out the present method, the particular organic resin or rubber formulation, the curing agent-containing molecular sieve, and a predetermined amount of release agent are combined by, for example, standard blending and mixing methods. While the mixed formulation is maintained at about processing temperature, the release agent has little or no effect on the curing agent-containing molecular sieve. Accordingly, while the system is stored for relatively long periods of time at about room temperature, little or no interaction occurs therein and the viscosity of the formulation increases at a very small rate. When curing is desired, the formulation is heated by any convenient means to achieve the desired cure temperature. This is above the temperature at which the release agent begins to modify the affinity of the molecular sieve for, and eventually to displace the active agent from the molecular sieve. The curing agent is released and the crosslinking mechanism proceeds. In practicing the method of the invention for the majority of epoxy resin formulations, a useful range of curing temperatures is from about 75° C. to about 175° C.; however, in special instances processing requirements may call for rapid cures at higher temperatures, such as around 200° C. For rubber formulations, curing temperatures in the range of about 135° C. to 200° C. are normally employed by the instant method.

A series of experiments were performed in which the effectiveness of various release agents in bringing out satisfactory curing characteristics without loss of good viscosity-time characteristics ("pot-life") was studied. The relative hardness or resistance to localized indentation of cured epoxy resin samples was evaluated by the Barcol hardness method commonly used for epoxy and polyester resins. The Barcol "Impressor" hardness tester (No. 935) employs a hardened indenter with a dial scale calibrated against an aluminum disc of 87–89 hardness; the peak reading of the scale obtained when the indenter is forced at right angles into the resin film is taken as the hardness value of that film. Viscosity-time behavior was followed by measurements of the initial viscosity and subsequent periodic sampling, in some cases over a period of weeks or months. Viscosity measurements were made with a Brookfield viscosimeter at 25° C. The Brookfield viscosimeter gives a direct determination of viscosity on the basis of measurement of the torque imposed on a calibrated spring by a spindle rotating at constant speed. The Model RVF used here permitted measurements at 4 speeds (2, 4, 10, and 20 r.p.m.) over a viscosity range of 0–2,000,000 centipoises.

EXAMPLE 1

Diethylenetriamine is a well-known curing agent for epoxy resins; 20 grams of this polyamine were loaded into the inner adsorption region of 80 grams of zeolite X. A mixture was prepared consisting of 48.8 grams of the diglycidyl ether of Bisphenol A (a liquid epoxy resin), 5.25 grams of dried glycerol, and 26.25 grams of the 20 wt. percent diethylenetriamine-loaded molecular sieve. This mixture formed a thixotropic resinous mass, and a sample portion placed in an oven at 100° C. cured to a hard resin in less than ten minutes. A second sample was placed under an infrared lamp at 82° C. and cured to a hard resin in eight minutes; this formulation, surprisingly enough, was still useable after two months storage at room temperature. In the absence of a release agent, adsorbed diethylenetriamine is not released from zeolite X at 100° C. in less than 10 minutes in an epoxy resin. In a control experiment employing the same temperature conditions and 10.8 parts of unloaded diethylenetriamine per 100 parts of the same liquid epoxy resin, the latter cured in five minutes; this formulation, however, had a pot life of only 30 minutes.

This experiment illustrates that when curing was desired, it was obtained almost as rapidly by release of the agent from a molecular sieve, as can be obtained when the agent is mixed directly with the epoxy resin. Moreover, the present invention permits packaging and storage of the formulation for long periods without appreciable curing whereas such storage is impossible if the curing agent is directly mixed in the formulation.

EXAMPLE 2

Another mixture was prepared of 97.6 grams of the same liquid epoxy resin as in Example 1, 52.4 grams of 20 wt. percent diethylenetriamine-loaded zeolite X powder, and 10.5 grams dried glycerol. The ingredients were thoroughly mixed and produced a pasty, thixotropic mass. During the curing step at 82° C., a sample of the resin did not change shape, i.e., did not flow when heated, thus demonstrating its thixotropic character. The uncured resin mass showed good storage stability, i.e., it retained its initial viscosity characteristics after two weeks at room temperature.

EXAMPLE 3

Although some hydroxyl materials are known curing agents for epoxy-amine reactions, relatively high reaction temperatures above 200° C. are usually required. To determine whether a hydroxyl material such as glycerol might itself be entering into the cross-linking reaction even at the relatively low curing temperature employed in the present method, the following lots of epoxy resin mixtures were prepared:

| Ingredient | Control | A | B | C |
|---|---|---|---|---|
| Diglycidyl ether of bisphenol A | 10 | 10 | 10 | 10 |
| Glycerol | | 1 | | 1 |
| 20 wt.-percent diethylenetriamine-loaded zeolite X | | | 5 | 5 |

[1] Weights in grams.

After heating these four batches for 10 minutes at 100° C., only the resin from Lot C (containing diethylenetriamine-loaded molecular sieve and glycerol) had cured, thus demonstrating that neither the glycerol by itself (Lot A), or the amine-loaded zeolite X by itself (Lot B) enters into the reaction at these temperatures.

EXAMPLE 4

The following batches of epoxy resin mixtures incorporated dried hydroxylated materials were prepared:

| Ingredient | A | B | C | D |
|---|---|---|---|---|
| Diglycidyl ether phenol A | 100 | 100 | 100 | 100 |
| 20 wt. percent diethylenetriamine-loaded zeolite X | 54 | 54 | 54 | 54 |
| 1,3 propylene glycol | 10.8 | | | |
| 1,4 butanediol | | 10.8 | | |
| 1,5 pentanediol | | | 10.8 | |
| Castor oil | | | | 10.8 |

[1] Weights in grams.

Samples of batches A, B and C cured in 10 minutes at 100° C., and in 5 minutes at 125° C. and 150° C. Samples of batch D did not cure even after 3 hours at 150° C. The Barcol hardness values of samples A, B and C after a 10-minute cure at 100° C. was 83, 83 and 85, respectively; after a 10-minute cure at 125° C. the values were 85, 87 and 87, respectively. The absence of cure in the sample of D is typical of the inability of oversize molecules to act as release agents and thus could not enter the molecular sieve pores and release the diethylenetriamine from the molecular sieve. Continued observation of the batches containing butanediol and pentanediol showed that these systems were room-temperature stable for longer than two months.

EXAMPLE 5

A mixture was prepared consisting of 100 parts by weight of the same liquid epoxy resin as used in Example 1, 54 parts of 20 wt. percent diethylenetriamine-loaded zeolite X and 10.8 parts of dried 2,3 butanediol, which contains secondary hydroxyl groups. Satisfactory cure of a sample was achieved after 15 minutes at 80° C. under an infrared lamp. This batch showed satisfactory viscosity stability after a two-week's storage period.

EXAMPLE 6

A mixture was prepared consisting of 25 grams of the same liquid epoxy resin, 17.5 grams of 20 wt. percent metaphenylenediamine-loaded zeolite X, and 3.5 grams of dried glycerol. These were mixed together at room temperature and resulting mass was thixotropic. A sample of this mixture cured in less than 30 minutes at 125° C. to a very hard maroon-colored solid; a control sample containing no glycerol release agent did not cure after three hours at 125° C.

EXAMPLE 7

Nine separate epoxy resin mixtures were prepared, each containing 10.8 grams of a different hydroxyl-containing material (dried) along with 100 grams of the previously employed liquid epoxy resin and 54 grams of 20 wt. percent diethylenetriamine-loaded zeolite X. The hydroxyl-containing materials were four polyethylene glycols, dipropylene glycol, polypropylene glycol (150 average mol. wt.), hexylene glycol, 1,5 pentanediol and phenol. As Table I shows, samples of batches A, H and I cured in 15 minutes at 163° C. Batches B, F, and G exhibited exceptionally good storage stability. Based on these data, a storage-life or "pot-life" of between four and six months is indicated.

EXAMPLE 8

Three batches of epoxy resin were prepared; in addition to 1000 grams of the liquid epoxy resin and 540 grams of 20 wt. percent diethylenetriamine-loaded zeolite X, one contained 108 grams of dried hexylene glycol. The second batch contained 108 grams of dried polyethylene glycol of about 400 molecular weight, and the third contained 108 grams of dried polypropylene glycol of 150 molecular weight. Curing tests were run on 5-gram samples of each of these mixtures. All samples were cured after 15 minutes at 125° C.; in curing tests at 150° and 175° C., all sample were cured in 5 minutes.

EXAMPLE 9

A coal tar-epoxy resin formulation was prepared from the following ingredients: the previously used liquid epoxy resin, 100 parts; liquid coal tar, 85 parts; 20 wt. percent diethylenetriamine-loaded zeolite X, 54 parts; hexylene glycol, 11 parts. Satisfactory cure of a sample was obtained in 10 minutes at 163° C. in an oven, and in 5 minutes when heated with a gas flame, the resin being covered by aluminum foil to prevent surface ignition. This mixture exhibited extended pot-life. The Brookfield viscosity originally (after initial mixing) and after 30 days were 40,000 and 36,000 centipoises, respectively.

TABLE I.—THE EFFECT OF HYDROXYL RELEASE AGENTS OF VARYING MOLECULAR WEIGHT UPON THE STABILITY AND CURE OF AN EPOXY RESIN

| Ingredients | A | B | C | D | E | F | G | H | I |
|---|---|---|---|---|---|---|---|---|---|
| Diglycidyl ether of bisphenol A | 100 | 100 | 100 | 100 | 100 | 100 | 100 | 100 | 100 |
| 20 wt. % diethylenetriamine-loaded zeolite X | 54 | 54 | 54 | 54 | 54 | 54 | 54 | 54 | 54 |
| Polyethylene glycol (Ave. mol. wt. 200) | 10.8 | | | | | | | | |
| Polyehtylene glycol (Ave. mol. wt. 400) | | 10.8 | | | | | | | |
| Polyethylene glycol (Ave. mol. wt. 600) | | | 10.8 | | | | | | |
| Polyethylene glycol (Ave. mol. wt. 1000) | | | | 10.8 | | | | | |
| Dipropylene glycol | | | | | 10.8 | | | | |
| Polypropylene glycol (Ave. mol. wt. 150) | | | | | | 10.8 | | | |
| Hexylene glycol | | | | | | | 10.8 | | |
| 1,5-pentanediol | | | | | | | | 10.8 | |
| Phenol | | | | | | | | | 10.8 |
| 15 min. at 100° C | Cure | N.C. | N.C. | N.C. | N.C. | N.C. | Cure | Cure | N.C. |
| 15 min. at 163° C | Cure | Cure | Cure | Cure | Cure | Cure | Cure | Cure | Cure |
| Brookfield viscosity at 25° C., centipoises: | | | | | | | | | |
| Original (4 r.p.m.) | 10,000 | 10,000 | 15,000 | 17,500 | 5,000 | 10,000 | 10,000 | 35,000 | 15,000 |
| 1 Day (4 r.p.m.) | 15,000 | 25,000 | 35,000 | 40,000 | 20,000 | 20,000 | 15,000 | 100,000 | 30,000 |
| 2 Days (4 r.p.m.) | 20,000 | 25,000 | 40,000 | 60,000 | 20,000 | 20,000 | 20,000 | 115,000 | 260,000 |
| 5 Days (4 r.p.m.) | 50,000 | 30,000 | 40,000 | 70,000 | 35,000 | 25,000 | 20,000 | 150,000 | >2 mm. |
| 12 Days (4 r.p.m.) | 60,000 | 40,000 | 55,000 | 45,000 | 50,000 | 30,000 | 25,000 | 150,000 | |
| 5 Weeks (4 r.p.m.) | 400,000 | 50,000 | 30,000 | 40,000 | 125,000 | 35,000 | 25,000 | 265,000 | |

EXAMPLE 10

A proposed commercial use required an epoxy resin formulation which could be applied on glass tape. It was required that the epoxy-impregnated tape be stable and uncured for at least 30 days at room temperature. Three epoxy compositions were prepared comprising blends of solid and liquid types based on the digycidyl ether of bisphenol A. These epoxy resin composition were mixed in formulations containing 20 wt. percent diethylenetriamine-loaded zeolite X, and dried 1,5 pentanediol as a release agent along with dried acetone to reduce the viscosity. These formulations were applied to 18-mil thick glass tape by a dipping method. The solvent was flashed off and the tapes rolled and placed in sealed containers. After a two-week storage period at room temperature, these tapes remained stable and curable. Samples of each tape cured at 100° C. after 15 minutes.

It is surprising that the previously described rapid-cure epoxy systems have good viscosity stability, since they contain rather viscous, large molecular weight materials acting as release agents. While extended pot-life in terms of weeks or months have been described herein, it should be recognized that a pot-life of even a few hours is all that is needed in certain industrial systems. Also, certain applications may require sufficient pot-life at a temperature between ambient and curing temperatures.

EXAMPLE 11

Two mixtures were prepared, one containing 100 parts of the epoxy resin, 54 parts of 20 wt. percent diethylenetriamine-loaded zeolite X, and 10.8 parts of polypropylene glycol (150 average mol. wt.) as release agent, and another containing the same except that 10.8 parts of polypropylene glycol (425 average mol. wt.) were used as release agent. Steel plates (1" x 2" size) were heated to approximately 400° F. When the above two mixtures were applied as coatings to the heated plates, satisfactory cures were obtained in about 6 and 10 seconds, respectively, after which the specimens were quenched in a cold water bath. Examination showed the coatings to be relatively free of pinholes or foaming, and without evidence of the charring previously observed when higher curing temperatures (440–460° F.) were attempted.

EXAMPLE 12

A basic recipe of 100 parts of the diglycidyl ether of bisphenol A liquid, 80 parts hexahydrophthalic anhydride, and 12.6 parts of 15 wt. percent dimethylethanolamine on zeolite X was prepared. Three hydroxy-containing release agents (1.8 parts) were added to separate samples, and the following results were obtained.

| | Release agent | | |
|---|---|---|---|
| | Polypropylene glycol (avg. mol. wt. 150) | Hexylene glycol | Polyethylene glycol (avg. mol. wt. 400) |
| Gel time at 250° F., mins | 30 | 35 | 25 |
| Viscosity stability at 77° F., cps.: | | | |
| Original | 3M | 2M | 3M |
| 4 days | 12M | 8M | 8M |
| 7 days | 13M | 8M | 16M |
| 14 days | 32M | 18M | 28M |
| 1 month | 820M | 390M | 1.4MM |

The basic recipe with pure dimethylamine rather than the latter compound loaded in the molecular sieve gels at 77° F. in 3–4 hours. It is thus apparent that far superior pot lives were realized by use of the present invention.

EXAMPLE 13

A series of SBR (styrene-butadiene) test recipes were prepared and compounded on a 6" x 12" roll mill. The results are as follows:

| Ingredient | Weight in grams | | | |
|---|---|---|---|---|
| | A | B | C | D |
| Styrene-butadiene plus carbon black | 300 | 300 | 300 | 300 |
| Zinc oxide | 10.0 | 10.0 | 10.0 | 10.0 |
| Stearic acid | 4.0 | 4.0 | 4.0 | 4.0 |
| Sulfur | 0 | 0 | 1.5 | 1.5 |
| 15 wt.-percent sulfur-loaded zeolite X | 20.0 | 20.0 | 0.0 | 0.0 |
| Piperidinium pentamethylene dithiocarbamate (PPD) | 2.0 | 2.0 | 0.0 | 0.0 |
| 20 wt.-percent PPD-loaded zeolite X | 0.0 | 0.0 | 10.0 | 10.0 |
| Hexylene glycol | 0.0 | 6.0 | 0.0 | 6.0 |
| Mooney scorch time at 300° F.: Minutes to 5 point rise | >30 | 3.0 | 4.7 | 2.8 |
| Modulus at 300% elongation, p.s.i.: Cure time (5 min.) at 350° F | (1) | 1050 | 1000 | 1100 |
| Ultimate tensile, p.s.i.: Cure time (5 min.) at 350° F | (1) | 2250 | 2000 | 2410 |
| Ultimate elongation, percent: Cure time (5 min.) at 350° F | (1) | 550 | 500 | 570 |

[1] No cure.

Recipes A and B were similar except for the addition of hexylene glycol to recipe B. Without the latter's presence, the sulfur loaded on zeolite X was not readily available to cure the styrene-butadiene polymer. This isolation effect was demonstrated by long Mooney scorch time at 300° F. and the failure to obtain a cure with recipe A in 5 minutes at 350° F. Hexylene glycol added to recipe B effectively displaced the sulfur to produce a good cure in 5 minutes at 350° F., and released the sulfur even at 300° F. as illustrated by the very short Mooney scorch time. In recipes C and D, the sulfur curing agent was added directly to the mix and the primary accelerator (PPD) was loaded on the molecular sieve. Recipes C and D were similar except for the addition of hexylene glycol to recipe D. It will be noted that in the recipe D formulation the release of the accelerator is evidenced by shorter Mooney scorch time at 300° F., higher modulus at 300% elongation, and higher ultimate tensile strength after curing 5 minutes at 350° F.

Although preferred embodiments of the invention have been described in detail, it is to be understood that modifications and variations may be effected without departing from the spirit and scope of the invention.

What is claimed is:

1. A heat curable formulation comprising (1) the diglycidyl ether of bis(4-hydroxy phenyl) dimethyl methane, (2) molecular sieve zeolite X containing an amine curing agent within the inner adsorption region, and (3) as a release agent, hexylene glycol.

2. A heat curable formulation comprising (1) the diglycidyl ether of bis(4-hydroxy phenyl) dimethyl methane, (2) molecular sieve zeolite X containing an amine curing agent within the inner adsorption region, and (3) as a release agent, glycerol.

3. A heat curable formulation comprising (1) the diglycidyl ether of bis(4 - hydroxy phenyl) dimethyl methane, (2) molecular sieve zeolite X containing an amine curing agent within the inner adsorption region, and (3) as a release agent, a polypropylene glycol of about 150 average molecular weight.

4. A heat curable formulation comprising (1) a butadiene-styrene rubber formulation, (2) molecular sieve zeolite X containing sulfur within the inner adsorption region, and (3) as a release agent, hexylene glycol.

5. Method for curing an epoxy compound having at least one vicinal epoxide group per molecule comprising the steps of providing a crystalline zeolitic molecular sieve containing a curing agent within its inner adsorption region; providing in a reaction zone at below curing temperature a mixture comprising: (1) the said epoxy compound having at least one vicinal epoxide group per molecule; (2) the curing agent-containing molecular sieve; and (3) as a release agent, at least one member of the group consisting of glycerol, hexylene glycol and a polypropylene glycol of about 150 average molecular weight; storing said mixture until curing is desired; thereafter heating said reaction zone to a curing temperature at which said curing agent is displaced from the molecular sieve; and thereafter maintaining said epoxy compound in contact with said curing agent until the desired degree of cure is attained.

6. Method of curing a butadiene-styrene rubber comprising the steps of providing a crystalline zeolitic molecular sieve containing a curing agent within its inner adsorption region; providing in a reaction zone at below curing temperature a mixture comprising: (1) the said butadiene-styrene rubber, (2) the curing agent-containing molecular sieve, and (3) as a release agent hexylene glycol; storing said mixture until curing is desired; thereafter heating said reaction zone to a curing temperature at which said curing agent is displaced from the molecular sieve; and thereafter maintaining said butadiene-styrene rubber in contact with said curing agent until the desired degree of cure is attained.

7. The method of claim 6 wherein the curing agent contained within the inner adsorption region of the molecular sieve is elemental sulfur.

References Cited

UNITED STATES PATENTS 2,882,243 4/1959 Milton.
3,036,983 5/1962 O'Connor.

WILLIAM H. SHORT, Primary Examiner

T. E. PERTILLA, Assistant Examiner

U.S. Cl. X.R.
260—41.5, 47